United States Patent [19]

Malgouires

[11] Patent Number: 5,107,402
[45] Date of Patent: Apr. 21, 1992

[54] PORTABLE COMPUTER PROVIDED WITH A TILTING SCREEN ARTICULATED THEREON BY TILTING LINKAGE WITH A BENT SHAPE

[75] Inventor: Pascal Malgouires, Cannes La Bocca, France

[73] Assignee: Telemecanique, France

[21] Appl. No.: 571,575

[22] PCT Filed: Jan. 4, 1990

[86] PCT No.: PCT/FR90/00005
§ 371 Date: Sep. 5, 1990
§ 102(e) Date: Sep. 5, 1990

[87] PCT Pub. No.: WO90/07742
PCT Pub. Date: Jul. 12, 1990

[30] Foreign Application Priority Data

Jan. 5, 1989 [FR] France ............... 89 00066

[51] Int. Cl.⁵ .............. H05K 7/16; E05D 7/086; G06F 1/00
[52] U.S. Cl. .................. 361/393; 16/307; 16/342; 248/921; 364/708
[58] Field of Search .......... 364/708; 361/380, 392, 361/393, 394, 395, 399; 16/307, 342; 248/284, 920, 921, 922, 923, 918

[56] References Cited

U.S. PATENT DOCUMENTS

| | | | |
|---|---|---|---|
| 2,862,229 | 12/1958 | Bacca | 16/342 |
| 4,018,104 | 4/1977 | Bland et al. | 16/342 X |
| 4,186,905 | 2/1980 | Brudy | 16/342 X |
| 4,270,723 | 6/1981 | Takaghashi et al. | 248/284 X |
| 4,639,147 | 1/1987 | Schwarz | 16/342 X |
| 4,829,633 | 5/1989 | Kassner | 16/322 |
| 4,832,419 | 5/1989 | Mitchell et al. | 358/254 X |
| 4,852,032 | 7/1989 | Matsuda et al. | 364/708 |
| 4,877,164 | 10/1989 | Baucom | 16/342 X |

FOREIGN PATENT DOCUMENTS 60-189523  9/1985  Japan .................. 364/708

Primary Examiner—Leo P. Picard
Assistant Examiner—Michael W. Phillips
Attorney, Agent, or Firm—William A. Drucker

[57] ABSTRACT

A portable data-processing terminal is provided comprising a central unit, a keyboard and a screen, the keyboard being disconnectable whereas the screen is connected to the central unit by an articulation device comprising at least one (cranked) bent lever, one end of which is articulated to a first face of said central unit, whereas the other end is articulated to the screen. With the (cranked) bent shape of the lever, the screen may be folded back against a second face of the central unit.

7 Claims, 4 Drawing Sheets

PORTABLE COMPUTER PROVIDED WITH A TILTING SCREEN ARTICULATED THEREON BY TILTING LINKAGE WITH A BENT SHAPE

BACKGROUND OF THE INVENTION

The present invention relates to a portable data-processing terminal with pivoting screen such, for example, as a micro-computer.

Generally, a data-processing terminal usually comprises an assembly formed of three elements, namely:
a central unit in the form of a case housing most of the electronic circuits used by this terminal (processor, disk storage units, cartridges, memory cards, power supply circuit, ventilation system, etc. . . );
a screen consisting usually of a cathode ray tube or a liquid crystal display; and
a keyboard with alphanumeric keys, of standard type.

In terminals of this kind, designed to be used in a fixed station, these three elements are very often in the form of separate modules so as to permit the user to dispose them conveniently for use.

However, because of the miniaturization of the components, this assembly may be made from two parts, the central unit then being incorporated either in the keyboard or in the screen.

Such is in particular the case in portable terminals proposed at the present time which very often have a structure similar to that of an attache case with two compartments hinged together and which can be detached from each other, one of the compartments containing the screen, whereas the other contains the keyboard as well as the main elements of the central unit.

Such miniaturization has also made it possible to construct so-called "pocket" portable apparatus in which the three above mentioned elements are assembled together in the same case of very small size.

However, despite the possibilities of miniaturization offered through the advance in the technique, it is scarcely desirable, for ergonomic reasons, to reduce the dimensions of the apparatus beyond certain limits.

In fact, the keyboard would become difficult to use and the possibilities of display on the screen would be considerably reduced, from the readability point of view. This is why the applications of pocket computers, which suffer from these drawbacks, remain relatively limited.

The portable terminals for professional use, mentioned above, of much larger size do not suffer from these drawbacks.

However, these terminals, which are mainly designed as a function of the portability criterion, very often to the detriment of ergonomics, are not always adapted to all conditions of use for which they are intended.

Such is the case particularly when these terminals are used in places (e.g. in a factory, on worksites or even in vehicles) not permitting the usual arrangement of keyboard and screen with respect to the operator.

The object of the invention is more particularly to overcome these drawbacks.

SUMMARY OF THE INVENTION

Contrary to the present tendency, a portable terminal is provided of the type comprising a central unit, a keyboard and a screen, the keyboard and the screen forming separate units of the central unit and comprising means for fixing them thereon, the keyboard being disconnectable, whereas the means for fixing the screen comprise at least one lever articulated to the central unit and to the screen by means of at least two articulations spaced apart from each other and disposed parallel to each other.

According to the invention, this terminal is more particularly characterized in that the lever is articulated to a first face of the central unit and has a bent shape so as to permit the screen to take up a position folded back against a second face of the central unit.

Similarly, the means for fixing the keyboard may comprise indexation and unlockable clipping means for folding said keyboard back against the face of the central unit against which the screen folds back.

In a preferred embodiment of the invention:
the central unit has a front face and, transversely to this front face, a base defining a support surface and a top opposed to the base;
the screen has a front face incorporating the display surface and edged by two opposite lateral faces which extend transversely with respect to this front face;
the means for fixing the screen then comprise two parallel bent levers which are articulated, by one of their ends, to two respective points situated in a central region of said lateral faces, along a first common articulation shaft parallel to the front face of the screen, and, by their other ends, to the top of the central unit, along a second articulation shaft parallel to the first one as well as to the front face of the central unit and to the support surface.

The keyboard may also have a relatively flat shape and comprise means for disconnectably fixing it to a region of the central unit adjacent the base, these fixing means being formed so as to serve for indexation and locking permitting the keyboard to be folded back against the front face of the central unit.

In this case, with an appropriate conformation of the screen, of the keyboard and of said fixing means, the terminal may be disposed in one of the two following transport configurations:
the screen is folded back against the front face of the central unit and is at least partially covered by the keyboard;
the keyboard is folded back against the front face of the central unit and is at least partially covered by the screen.

BRIEF DESCRIPTION OF THE DRAWINGS

One embodiment of a terminal in accordance with the invention will be described hereafter, by way of non limitative example, with reference to the accompanying drawings in which.

DESCRIPTION OF THE PREFERRED EMBODIMENT

Figure 1:
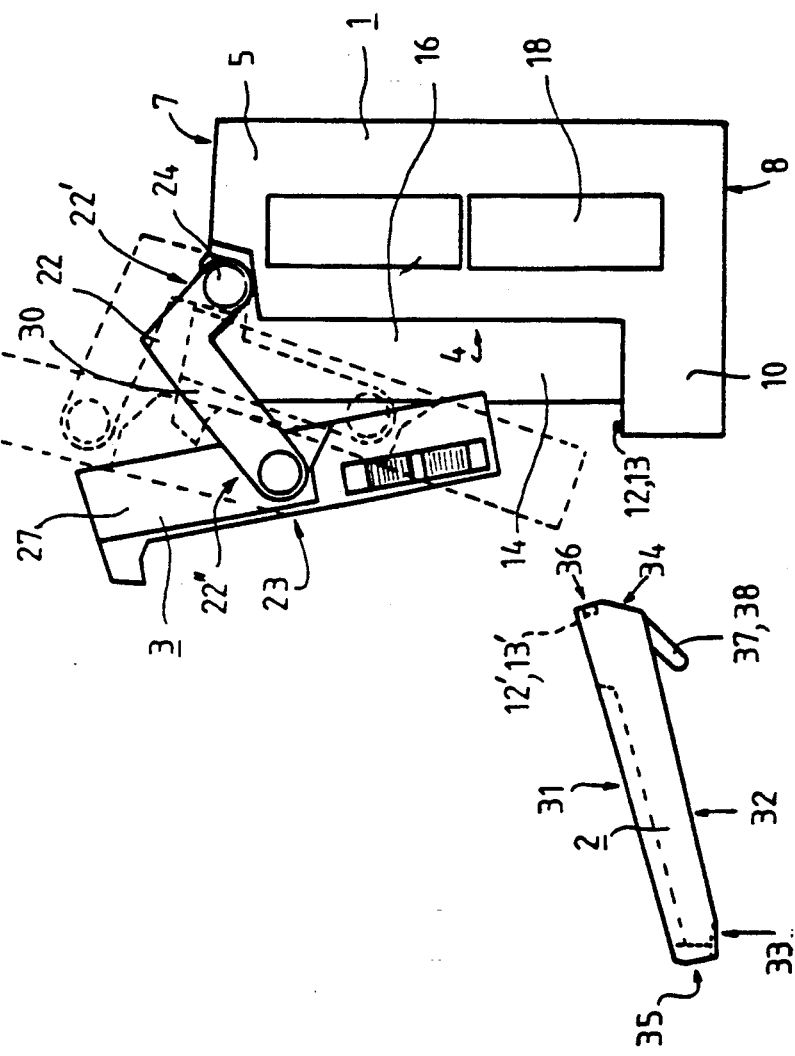
FIG. 1 is a side view (in schematic perspective) of the terminal in the opened out position, this view showing different positions of use of the screen.
Figure 2:
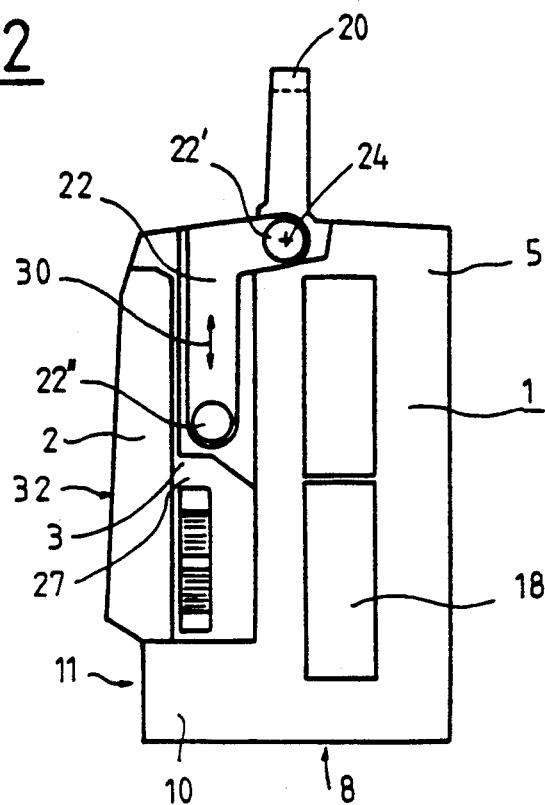
FIGS. 2 to 6 are views of the terminal in the folded up position, FIG. 2 showing the right-hand side, FIG. 3 the left-hand side, FIG. 4 the closed front face, FIG. 5 the open front face and FIG. 6 the top.
Figure 3:
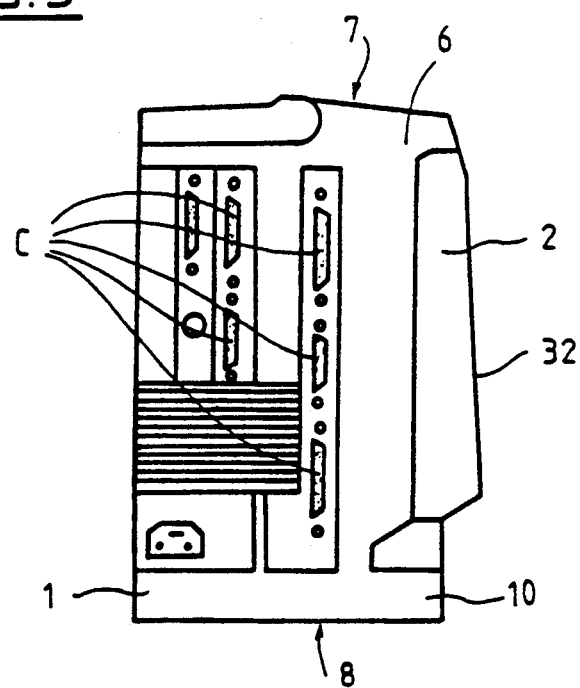
Figure 4:
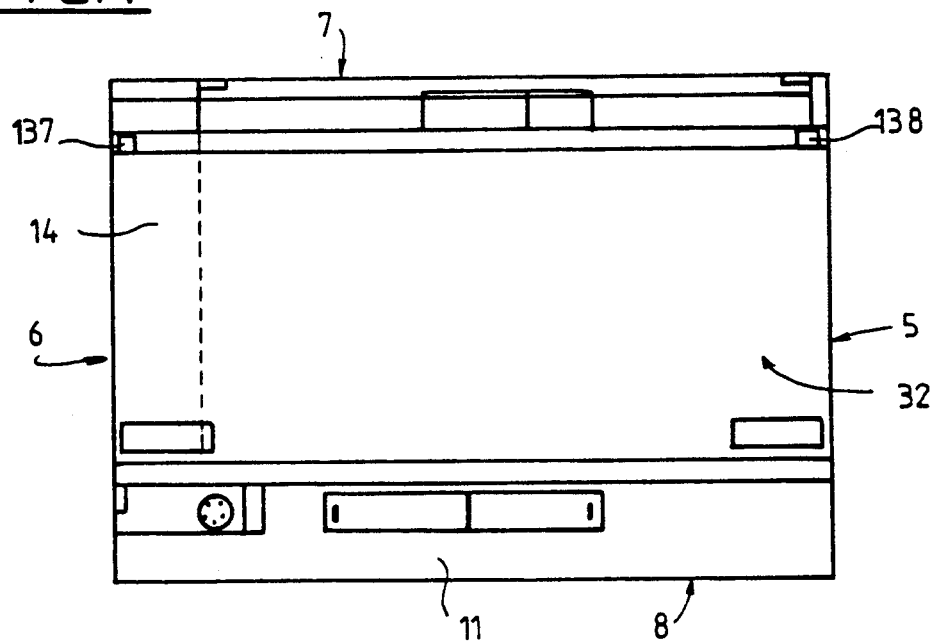
Figure 5:
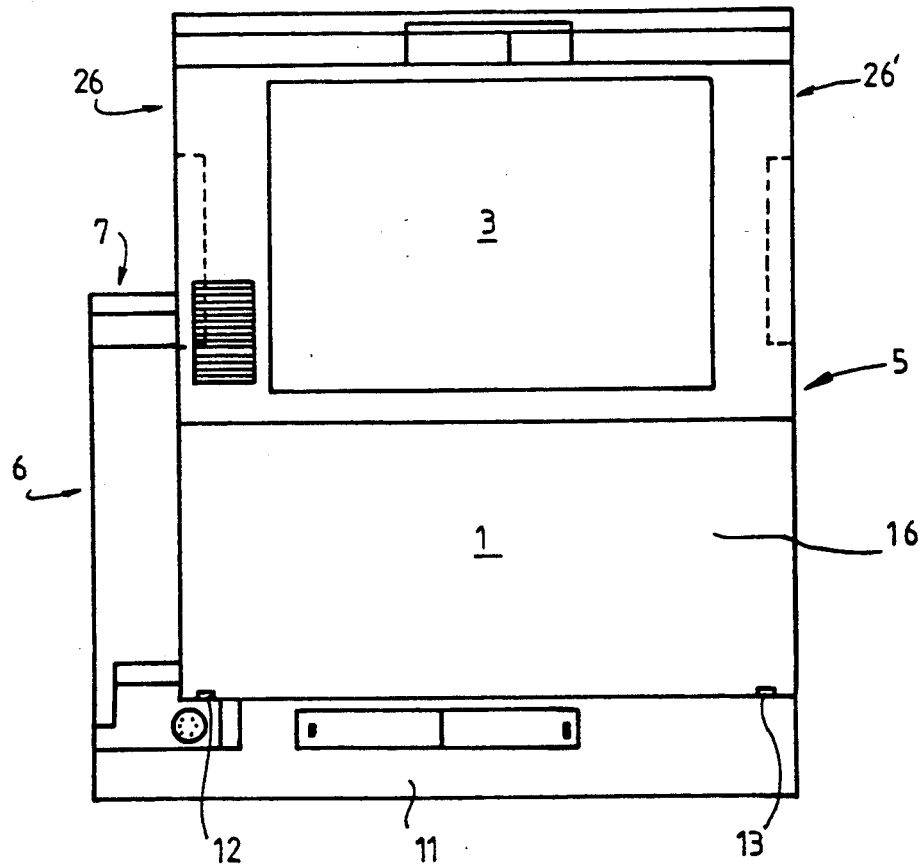
Figure 6:
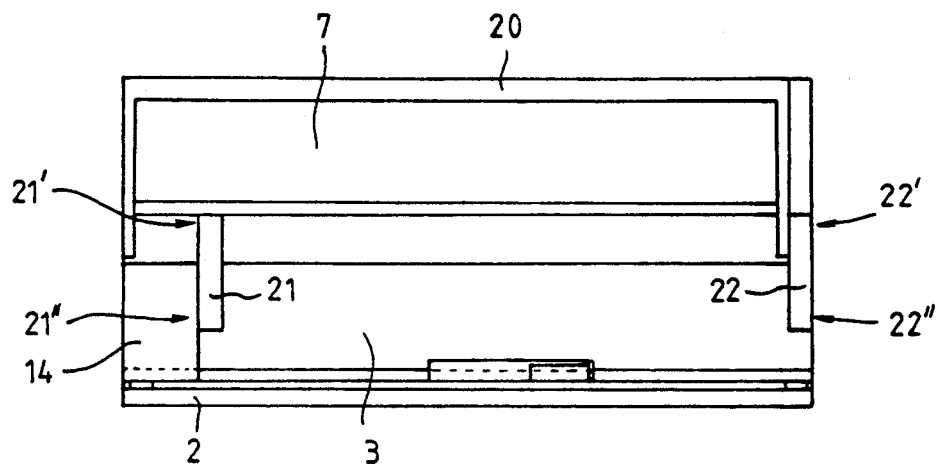

The portable terminal shown in the drawings comprises, in accordance with the invention, three separate modules, namely: a central unit 1, a keyboard 2 and a screen 3.

In this example, the central unit 1 is in the form of a case whose front face 4, lateral faces 5,6 and top 7 are visible in the drawings.

This case has, in a plane perpendicular to its front face 4, a substantially L shaped section and, in a perpendicular plane, a substantially rectangular section.

The front face 4 comprises, in a region adjacent the base 8 of the case, a parallelepipedic projection 10 forming the horizontal bar of the L, whose front face 11 is provided with two studs 12,13 whose purpose will be stated further on.

In addition, the lateral face 6 of the case is extended above the projectioning by a dividing wall 14 which defines, with the upper face of projectioning 10, a cavity 16 open at the front which serves for receiving screen 3, in the folded up position of the terminal.

The lateral face 6 carries the connection elements C of the terminal, whereas the lateral face 5 is provided with access doors 18 to the storage units, for example disk read-out units.

The upper face 7 contains means for articulating a handle 20 as well as bent lever 21,22 supporting the screen 3.

The latter consists of a liquid crystal display and has a flat substantially parallelepipedic shape, whose front face 23 forms the display surface.

This screen is connected to the case of the central unit by means of the bent levers 21,22 which extend in planes perpendicular to front face 4 and which are articulated:
  by one of their ends 21', 22' to the upper face 7, about a first common articulation shaft 24, parallel to the front face 4 and to base 8, housed under face 7, and
  by the two ends 21",22" to the lateral faces 26,26' of screen 3, about a common articulation shaft parallel to shaft 24, for example by means of two swivel pins situated substantially in the center of the lateral faces 26, 26'.

Levers 21,22 are dimensioned and formed so that they may occupy a multiplicity of positions between:
  an opened out position, in which arm 30 of levers 21,22 articulated to screen 3, extends substantially at 15° above the upper face 7, in which position screen 3 may pivot through 120° about its swivel pins (position shown with broken lines in FIG. 1); and
  a folded up position, in which arms 30 of levers 21,22 are disposed substantially against the front face 4, and screen 3 is engaged in the cavity 16 parallel to said front face 4 (position shown in FIGS. 2 to 5).

In this example, lever 22 extends substantially to the level of the lateral face 5, whereas lever 21 is offset inwardly with respect to the lateral face 6, the distance separating the two levers 21,22 being less than the distance between the two lateral faces 5,6 of the central unit 1.

Keyboard 2 is in the form of a flat case, of a substantially parallelepipedic shape, whose front face 31 is equipped with a plurality of keys appropriate to the functions of the terminal and whose bottom 32 comprises two bevelled zones 33,34 situated respectively at the level of the front 35 and rear 36 edges.

The dimensions of this keyboard 2 are provided so that the bottom 32 may play the role of a cover closing cavity 16 of the front face 4 of the central unit 1 in the folded up position of the terminal.

Keyboard 2 further comprises, in its rear part, two parallel arms 37,38 articulated about a common shaft parallel to the rear edge 36.

These arms 37,38, once oriented downwardly, serve as mounts for disposing keyboard 2 according to the inclination desired by the user. The rear edge 36 of keyboard 2 comprises two cavities 12',13' fitting over pins 12,13 of projection 10 of the central unit 1, which makes it possible to pivot the indexed keyboard on these pins for folding it back against the front face 4 and immobilizing it by means of an unlockable clipping device 137,138.

With these arrangements, the terminal may be folded back into the position shown in FIGS. 2 to 4 and 6, by first of all folding the screen 3 flat against the front face 4 of the central unit, partially inside cavity 16, then by folding back keyboard 2 against said front face 4 having screen 3, the bottom 2 of the keyboard being oriented outwardly so as to play the role of cover.

It should be noted that the electric connections between the central unit 1 and screen 3 are provided by conductors passing inside levers 21,22, whereas the keyboard/central unit electric connections are provided by a flexible electric cable which may be housed in a receptacle provided in keyboard 3.

Such as described above, the terminal has a great flexibility in use.

In fact, whatever the position of the central unit 1, the operator may incline the screen so as to orient it as a function of his position and where he has disposed the keyboard 2.

Figure 7:
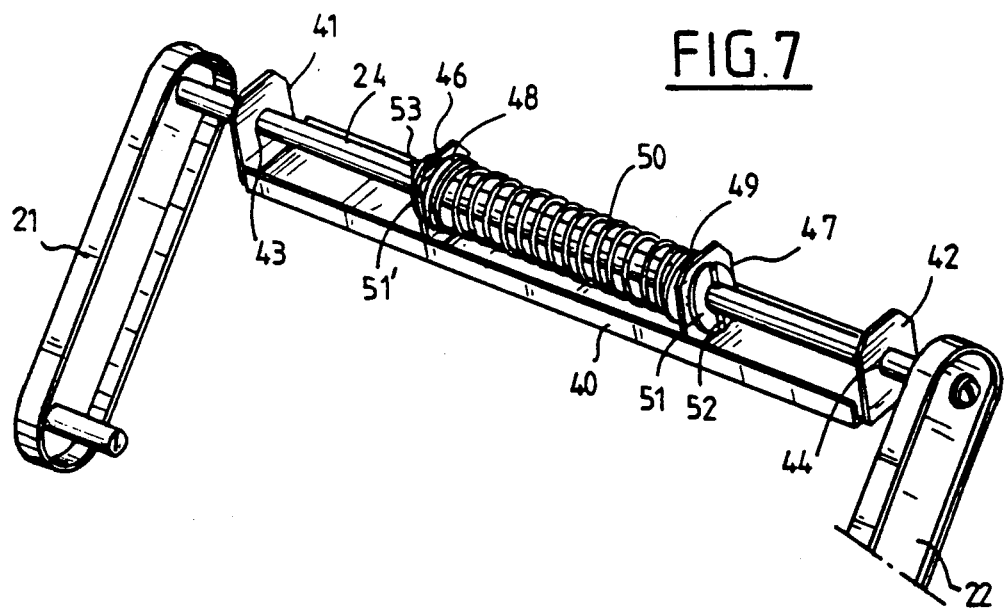
FIG. 7 is a schematic perspective representation of an articulation device with friction ring usable in the terminal shown in FIGS. 1 to 6.

The screen 3 may then be held in the chosen position by using, for the articulations situated between levers 21,22 and the central unit 1, a friction ring device of the type shown in FIG. 7.

This device comprises a conventional type articulation support 40, in the form of a U whose parallel flanges 41,42 are provided with two respective bores 43,44 through which the pivot shaft 24 is passed and may freely pivot, to the ends of which levers 21,22 are fixed.

This articulation support 40 further comprises, in the space between flanges 41,42, two additional transverse flanges 46,47 having a certain flexibility with respect to support 40 and through which shaft 24 freely rotates.

This device further comprises four friction rings 48 and 49, 51 and 51' mounted coaxially on shaft 24, respectively on each side of the two flanges 46,47, these two rings 48,49 being axially slidable along shaft 24 while being driven in rotation thereby.

These two rings 48,49 are subjected to the force of a spring 50 which tends to push them against flanges 46,47. Because of the flexibility of flanges 46,47, this force is transferred to rings 51,51' retained by pins 52,53. Consequently, each of flanges 46,47 is clamped between a pair of rings 48,51–49,51'. Spring 50 is then designed so as to exert on rings 48,49 a sufficient pressure so as to generate, at the level of the ring 51'/flange 46/ring 48 and ring 49/flange 47/ring 51 junctions, a friction torque greater than the maximum torque generated by the weight of screen 3, whatever its position with respect to central unit 1.

With this feature, the changes of orientation of screen 3 can only be carried out by a voluntary action of the operator.

It is clear that a similar articulation device may be used for the articulation between levers 21,22 and the screen 3.

Furthermore, it should be emphasized that the invention is not limited to the above described embodiment. Thus, the means for fixing the screen may comprise only a single articulated lever, for example in the middle of one of the faces of the central unit, preferably the upper face, this lever being bent so as to be able to fold the screen back against another face of the central unit, preferably against the front face.

What is claimed is:

1. A portable data-processing terminal of the type comprising a central unit, a keyboard and a screen, the keyboard and the screen forming separate units of said portable data-processing terminal and comprising means for fixing said keyboard to said central unit and means for fixing said screen to said central unit, the keyboard being disconnectable from said central unit, the means for fixing the screen further comprising at least one lever articulated to the central unit and to the screen by means of two respective articulations spaced apart from each other and disposed parallel to each other, wherein said lever is articulated to an upper face of the central unit and has a bent shape so as to permit the screen to occupy a plurality of positions between an opened position in which the levers extend partially above said upper face and said screen may pivot about an axis located above said upper face, and a folded position in which the screen is folded back against a second face of the central unit.

2. The terminal as claimed in claim 1, wherein said means for fixing the keyboard comprise indexation and unlockable clipping means permitting the keyboard to take up a position folded back substantially against said front face of the central unit.

3. The terminal as claimed in claim 1, further comprising a folded up position in which the screen is folded back against said front face and the keyboard, in the folded up position, is applied against the screen.

4. The terminal as claimed in claim 1, wherein said front face forms an open cavity containing the screen at least partially, in the folded up position thereof.

5. The terminal as claimed in claim 1, further comprising two bent levers which are articulated:
    by one of their ends to the upper face of the central unit, about a first common articulation shaft parallel to said upper and front faces, and
    by the other two ends, to two opposite lateral faces of the screen about a second shaft parallel to said first common articulation shaft and passing through central regions of said two opposite lateral faces.

6. The terminal as claimed in claim 5, wherein the articulation of said levers to the screen further comprises:
    an articulation support having two transverse flanges through which an articulation shaft freely rotates, to the ends of which the two levers are fixed;
    two friction rings mounted coaxially on said shaft in the portion between said two flanges so as to be able to slide axially while being driven in rotation by said shaft; and
    a spring disposed between these two rings so as to apply them respectively against the two flanges.

7. The terminal as claimed in claim 6 wherein said flanges are flexible and bear, on the side opposite the spring, on two respective additional friction rings axially slidable on said shaft, but driven in rotation thereby, these two additional friction rings being retained axially, on one side, by two respective stops fast with said shaft.

* * * * *